(12) United States Patent
Asou et al.

(10) Patent No.: US 7,936,116 B2
(45) Date of Patent: May 3, 2011

(54) MOTOR STATOR WITH IMPROVED END SURFACE INSULATING PLATE, MOTOR INCLUDING THE MOTOR STATOR, PUMP INCLUDING THE MOTOR STATOR, AND MANUFACTURING THE MOTOR STATOR

(75) Inventors: Hiroki Asou, Tokyo (JP); Mamoru Kawakubo, Tokyo (JP); Mineo Yamamoto, Tokyo (JP); Hiroyuki Ishii, Tokyo (JP); Tougo Yamazaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 12/159,674

(22) PCT Filed: Feb. 26, 2007

(86) PCT No.: PCT/JP2007/053535
§ 371 (c)(1),
(2), (4) Date: Jun. 30, 2008

(87) PCT Pub. No.: WO2008/105054
PCT Pub. Date: Sep. 4, 2008

(65) Prior Publication Data
US 2010/0264757 A1 Oct. 21, 2010

(51) Int. Cl.
*H02K 1/04* (2006.01)

(52) U.S. Cl. .......... 310/410; 310/216.114; 310/216.115; 310/216.118; 310/71; 310/43; 310/216.117; 310/216.116; 310/260; 310/270

(58) Field of Classification Search ............ 310/71, 310/43, 260, 270, 216.114–216.118, 400–433; H02K 1/04
See application file for complete search history.

(56) References Cited

U.S. PATENT DOCUMENTS
1,261,126 A * 4/1918 Hellmund .................. 310/58
(Continued)

FOREIGN PATENT DOCUMENTS
JP 3-117340 U 12/1991
(Continued)

OTHER PUBLICATIONS
Form PCT/ISA/210 (International Search Report) dated May 29, 2007, with English translation of category of cited documents.
(Continued)

*Primary Examiner* — Quyen Leung
*Assistant Examiner* — Terrance Kenerly
(74) *Attorney, Agent, or Firm* — Buchanan Ingersoll & Rooney PC (57) ABSTRACT

An objective is to provide a motor stator that may achieve: a reduction in parts costs by shaping coil ends so that length thereof is reduced, thereby reducing the amount of use of copper, and minimizing the amount of use of binding strings for securing the coil ends in place; a reduction in manufacturing process costs by a structure which allows a protector and a wire lead outlet part to be easily assembled; and then an improvement in quality of a stator by firmly holding the coil ends and the protector. The motor stator may include a stator core 1 including slots; a plurality of cut surfaces forming flat surfaces on the outer surface of the stator core 1; end surface insulating plates 2 formed in an approximately same shape as the shape of magnetic steel plates punched out, and assembled into the stator core 1 on both axial end surfaces thereof; projections formed in a vicinity of a peripheral portion of an end surface insulating plate 2, and engaged with the cut surfaces on the stator core 1; slot-like cutouts, a little larger in size than the slots, formed on an inner peripheral side of the each end surface insulating plate 1; and coil ends. The coil ends are shaped by pressure against the end surface insulating plates 2.

13 Claims, 5 Drawing Sheets

U.S. PATENT DOCUMENTS

| | | | |
|---|---|---|---|
| 2,892,111 A * | 6/1959 | Young, Jr. ............... 310/195 |
| 4,088,913 A * | 5/1978 | Prigorovsky et al. ......... 310/260 |
| 4,403,162 A * | 9/1983 | Pallaro ..................... 310/194 |
| 5,508,571 A * | 4/1996 | Shafer, Jr. ................. 310/71 |
| 5,717,273 A * | 2/1998 | Gulbrandson et al. ........ 310/260 |
| 6,043,584 A * | 3/2000 | DeHart .................... 310/260 |
| 6,066,905 A * | 5/2000 | Wright et al. ............... 310/179 |
| 2001/0002507 A1 * | 6/2001 | Miller et al. ................. 29/596 |
| 2002/0047483 A1 | 4/2002 | Oohashi et al. |
| 2004/0061409 A1 * | 4/2004 | Grant et al. ................ 310/217 |
| 2004/0172805 A1 | 9/2004 | Tokizawa |
| 2005/0127775 A1 * | 6/2005 | Lee et al. .................. 310/216 |
| 2005/0194858 A1 * | 9/2005 | Ahn ........................ 310/216 |
| 2007/0007840 A1 * | 1/2007 | Chen et al. ............. 310/156.43 |
| 2007/0194654 A1 * | 8/2007 | Rush et al. ................ 310/260 |

FOREIGN PATENT DOCUMENTS

| | | |
|---|---|---|
| JP | 4-017657 U | 2/1992 |
| JP | 6-141515 A | 5/1994 |
| JP | 8-149737 A | 6/1996 |
| JP | 2001-275283 A | 10/2001 |
| JP | 2003-299291 A | 10/2003 |
| JP | 2004-194413 A | 7/2004 |
| JP | 2004-274858 A | 9/2004 |
| JP | 2006-014594 A | 1/2006 |

OTHER PUBLICATIONS

Grounds of Rejection dated Jul. 20, 2010, issued in the corresponding Japanese Patent Application No. 2007-529293, and a partial English-language Translation thereof.

Vietnamese Office Action dated Feb. 17, 2011 issued in the corresponding Vietnamese Patent Application No. 1-2008-01314, and English-language translation of Office Action.

* cited by examiner

MOTOR STATOR WITH IMPROVED END SURFACE INSULATING PLATE, MOTOR INCLUDING THE MOTOR STATOR, PUMP INCLUDING THE MOTOR STATOR, AND MANUFACTURING THE MOTOR STATOR

TECHNICAL FIELD

The present invention relates to a motor stator. More particularly, the present invention relates to a method of securing coil ends in place and a method of assembling components into a stator, when a stator core is insulated on the axial end surfaces, and the coil ends are shaped so that the axial length thereof is reduced.

BACKGROUND ART

A motor stator and a method of manufacturing a motor stator have been proposed (See Patent Document 1, for example). This disclosure is directed to a method of insulating a stator core and fixing a stator winding in order to manufacture a thin motor stator. In order to achieve the method, an insulating layer is formed on the slots and end surfaces of the stator core by integrally forming an insulating resin film with the stator core. At the same time, projecting structural parts are formed in radial positions that are out of the outer surface of the stator core. A Winding is then inserted, and shaped so that the length is reduced. Wire leads are then connected to the winding. The wire leads are then fitted to one of the projecting structural parts. The other projecting structural part formed on the opposite side is cut out. The cut out projecting structural part is placed on the wire leads so that the wire leads are sandwiched and secured. The winding is further secured by binding strings, varnishing, etc. Then, the stator core, the winding, etc. are integrally formed by insulating resin to obtain a stator part. In order to withstand the resin molding pressure, the wire lead sandwiched part formed by the projecting structural parts is molded with resin by pressure holding of a mold die.
Patent Document 1: P8-149737A

DISCLOSURE OF THE INVENTION

Problems to be Solved by the Invention

With the motor stator disclosed in the Patent Document 1, however, the coil ends of the stator are shaped to reduce the axial length thereof, and binding strings are wound around the outer surface of the stator core and the slot portion. There is nothing on the outer surface of the stator core to stop the binding strings moving in the circumferential direction. This poses a problem of allowing the binding strings to move easily in the circumferential direction on the outer surface of the stator core.

Another problem is that there is no portion provided for assembling a protector to protect a motor and therefore the assembly of the protector is difficult.

The present invention is directed to solving the problems described above. It is an object to provide a motor stator, a motor, a pump, and a method of manufacturing the motor that may achieve the following objects:
(1) to reduce parts costs by shaping coil ends so that length thereof is reduced, thereby reducing the amount of use of magnet wires, and minimizing the amount of use of binding strings for securing the coil ends in place;
(2) to reduce manufacturing process costs by a structure which allows a protector and a wire lead outlet part to be easily assembled; and
(3) to improve stator quality by firmly holding the coil ends and the protector.

Means to Solve Problems

A motor stator according to this invention is characterized by including a stator core that may be formed by layering magnetic steel plates punched into a predetermined shape, wherein the stator core may include a plurality of slots to hold coils; a plurality of cut surfaces that may be formed on an outer surface of the stator core in an axial direction to provide flat surfaces on the outer surface, wherein the plurality of cut surfaces may be spaced apart from one another by a predetermined distance along a circumferential direction; end surface insulating plates that may be assembled into the stator core on both axial end surfaces thereof, wherein each end surface insulating plate may be a little larger in outer diameter than the stator core, and formed in an approximately same shape as the predetermined shape of the magnetic steel plates punched out to form the stator core; a plurality of projections that may vertically extend in a vicinity of a peripheral portion of the each end surface insulating plate, wherein the plurality of projections may be engaged with the cut surfaces on the stator core when the end surface insulating plates are assembled into the stator core; slot-like cutouts that may be a little larger in size than the slots of the stator core, and formed on an inner peripheral side of the each end surface insulating plate; and coil ends, which may be portions of the coils, that may extend out of the both axial end surfaces of the stator core in the axial direction, The coil ends may be characterized by being shaped by pressure against the end surface insulating plates.

The motor stator according to this invention is characterized in that the end surface insulating plates may include a plurality of string catch notches formed on an outer peripheral edge thereof to hold binding strings to secure the coil ends in place.

The motor stator according to this invention is characterized by including a wire lead outlet part that may sandwich wire leads to be connected to end portions of the coils, and may be assembled into the end surface insulating plate. The wire lead outlet part may include a first nail for assembly. The each end surface insulating plate may include a plurality of wire lead outlet part mounting holes that are provided to be engaged with the first nail of the wire lead output part in the vicinity of the peripheral portion.

The motor stator according to this invention is characterized by including a protector protecting part that may hold a protector for cutting off an electric current when the coils reach a predetermined temperature, and is assembled into the end surface insulting plate, wherein the protector protecting part may include a nail for assembly, The each end surface insulating plate may include a plurality of protector protecting part mounting holes that are provided to be engaged with the nail of the protector protecting part in the vicinity of the peripheral portion.

The motor stator according to this invention is characterized in that the protector protecting part may include in a vicinity of a peripheral portion thereof protector protecting part string grooves for fixing, and may be bound to a coil end via the protector protecting part string grooves.

The motor stator according to this invention is characterized in that the motor stator may be held by a stator holding portion of a mold die via the end surface insulating plates while the motor stator is molded, thereby preventing the stator core from being exposed after the motor stator is molded.

A motor according to this invention is characterized by using the motor stator described above.

A pump according to this invention is characterized by using the motor described above.

A method of manufacturing a motor according to this invention is characterized by including:

a) punching and layering magnetic steel plates to form a stator core, and in parallel, molding a thermoplastic resin into end surface insulating plates, in a first step;

b) assembling two of the end surface insulating plates on both end surfaces of the stator core, and in parallel, producing slot cells, in a second step;

c) inserting the slot cells into the stator core, and in parallel, producing coils and wedges, in a third step;

d) inserting the coils and the wedges into the stator core at a time with an aid of a jig for coil insertion, in a fourth step;

e) shaping the coil ends by pressure against the end surface insulating plates, and in parallel, molding the thermoplastic resin into a first protector protecting part and a second protector protecting part, in a fifth step;

f) connecting wire leads to end portions of the coils, and in parallel, placing a protector inside a hollowed out space of the first protector protecting part, and assembling the second protector protecting part into the first protector protecting part, in a sixth step;

g) assembling the protector protecting part holding the protector into the stator, engaging the protector protecting part with a predetermined mounting hole formed on an end surface insulating plate, and binding the protector protecting parts to the coil end, in a seventh step;

h) securing the coil ends in place by a binding string, and in parallel, molding the thermoplastic resin into a first wire lead outlet part and a second wire lead outlet part, in an eighth step;

i) assembling the wire lead outlet part into the stator, in a ninth step;

j) molding the stator to form a molded stator, and in parallel, producing brackets and a rotor assembly, in a tenth step; and k) assembling the molded stator, the rotor assembly, and the brackets together to have an assembly of a motor, in an eleventh step.

EFFECTS

According to a motor stator of this invention, coil ends are shaped by pressure against end surface insulating plates, thereby reducing the axial length of the coil ends. This may result in reducing the amount of use of magnet wires and minimizing the amount of use of binding strings for fixing the coil ends. Hence, parts costs may be reduced.

BEST MODE FOR IMPLEMENTING THE INVENTION

Embodiment 1

Figure 1:
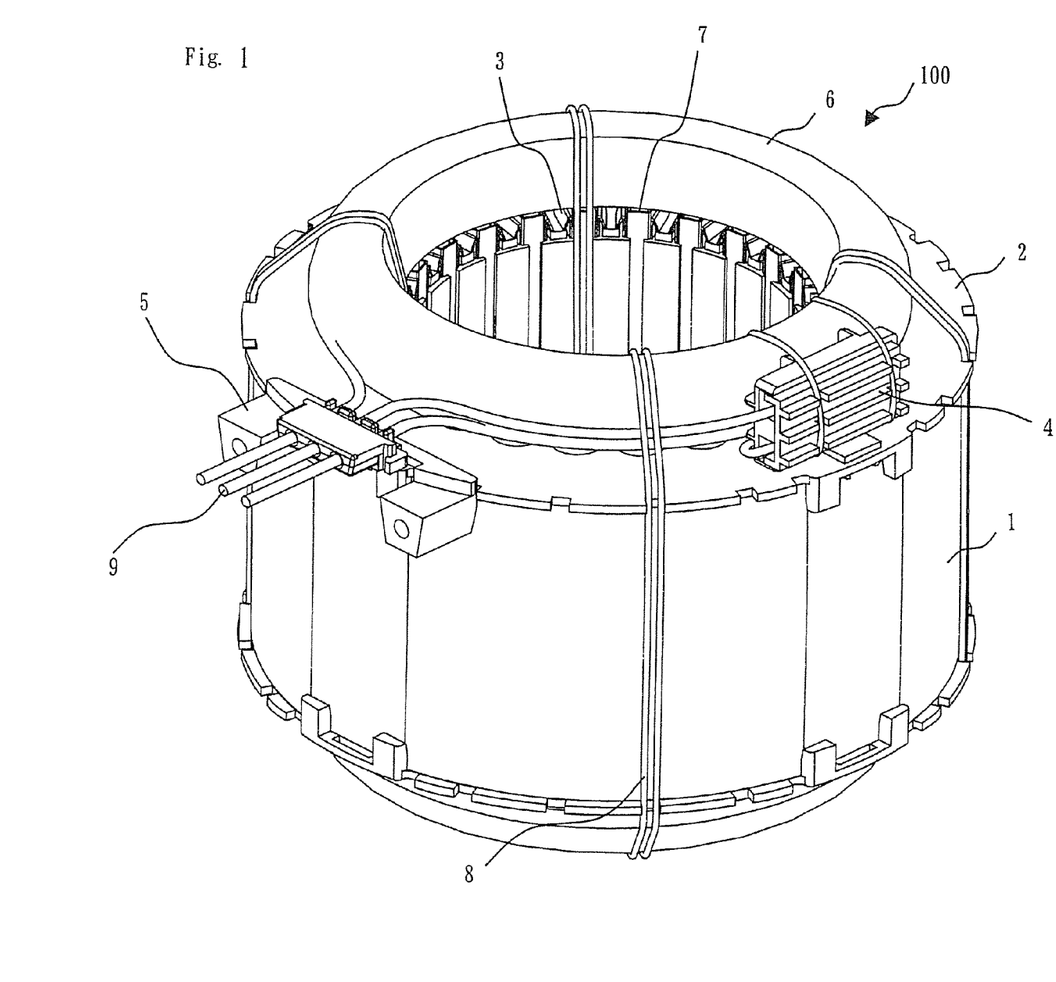
FIG. 1 It is a diagram describing a first embodiment, which shows a perspective view of a stator 100.
Figure 2:
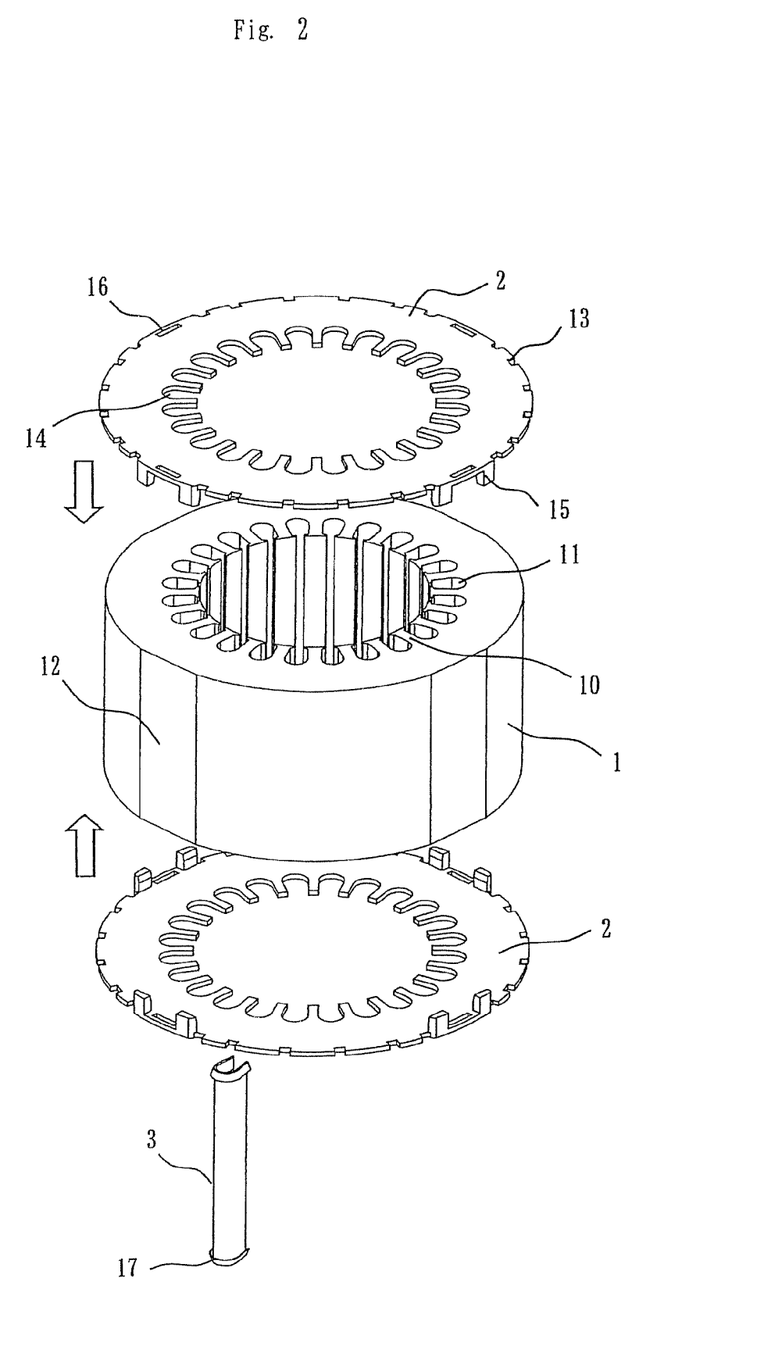
FIG. 2 It is a diagram describing the first embodiment, which shows an exploded perspective view illustrating structural relations of a stator core 1, end surface insulating plates 2, and a slot cell 3.
Figure 3:
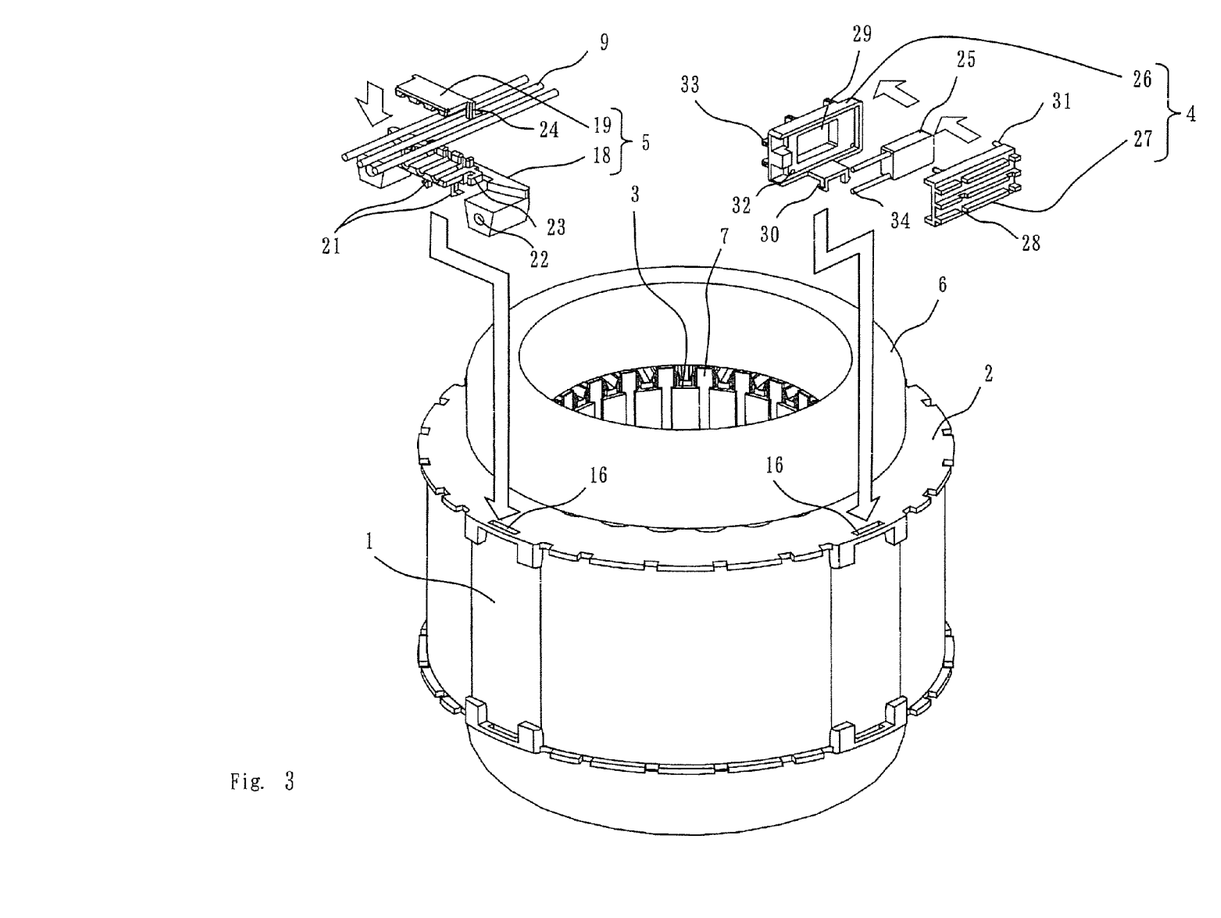
FIG. 3 It is a diagram describing the first embodiment, which shows an exploded perspective view illustrating a condition before the stator core 1 is assembled with a wire lead outlet part 5 and a protector protecting part 4.
Figure 4:
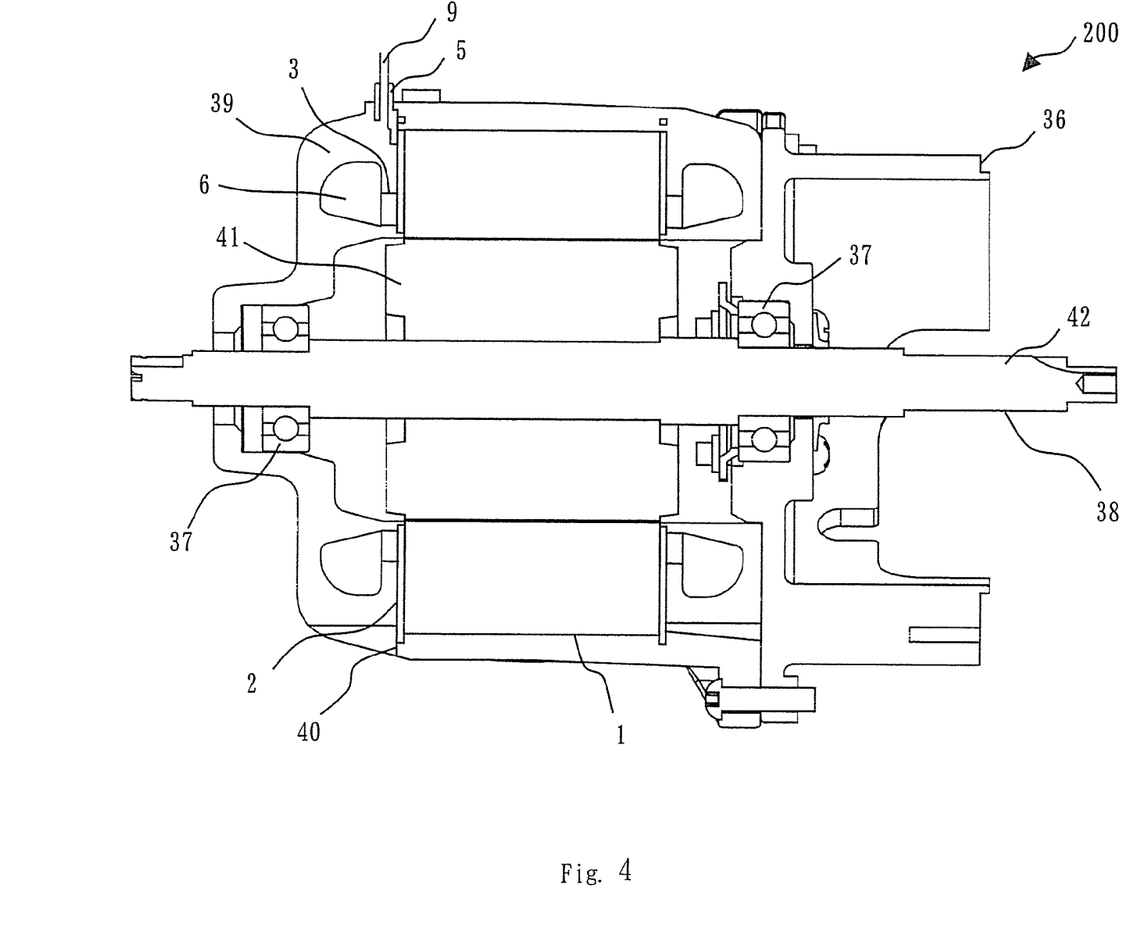
FIG. 4 It is a diagram describing the first embodiment, which shows a cross section of a motor 200.
Figure 5:
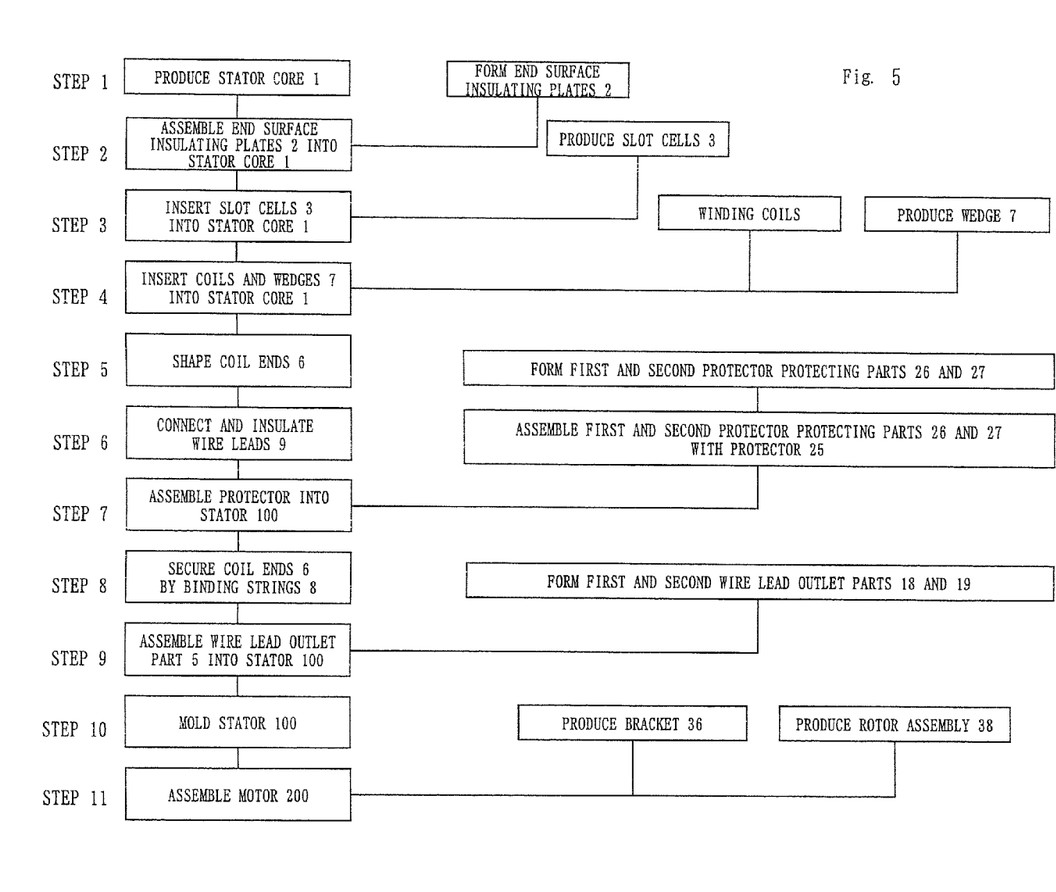
FIG. 5 It is a diagram describing the first embodiment, which shows a manufacturing process of the motor 200.

A first embodiment is illustrated in FIG. 1 to FIG. 5. FIG. 1 shows a perspective view of a stator 100. FIG. 2 shows an exploded perspective view illustrating structural relations of a stator core 1, end surface insulating plates 2, and a slot cell 3. FIG. 3 shows an exploded perspective view illustrating a state of the stator core 1 before a wire lead outlet part 5 and a protector protecting part 4 are assembled into the stator core 1. FIG. 4 shows a cross section of a motor 200. FIG. 5 shows a chart illustrating a manufacturing process of the motor 200.

A structure of the stator 100 is described with reference to FIG. 1. The stator 100 of FIG. 1 is a stator of a single-phase induction motor as an example of a motor. In this embodiment, a description will be given with reference to the stator of the single-phase induction motor as an example. The stator core 1 is formed by punching 0.35-0.5 mm thick magnetic steel plates and layering the magnetic steel plates by caulking, wildering, etc. Further detail of the structure of the stator core 1 will be given later.

The stator core 1 is assembled with the end surface insulating plates 2 on the both axial end surfaces. The end surface insulating plates 2 are formed by molding thermoplastic resin. The end surface insulating plates 2 will also be described later in detail.

The slot cell 3 is inserted into a slot on the stator core 1. (FIG. 1 only shows the openings of slots on the inner surface of the stator core 1. See slots 11 shown in FIG. 2.) The slot cell 3 is an insulating member that insulates between a slot and coils (magnet wires).

The protector protecting part 4, which holds a protector to protect a motor, is bound to one of coil ends 6 that extend out from the stator core 1 on the both sides in the axial direction. (The protector is not seen in FIG. 1. See a protector 25 shown in FIG. 3.)

The stator winding of a single-phase induction motor is formed to include a main winding and an auxiliary winding. The main winding and the auxiliary winding are connected to wire leads 9. The wire leads 9 are connected to a power source to supply power to the main winding and the auxiliary winding. The stator of the single-phase induction motor uses three of the wire leads 9 in total, i.e., two to be connected to coil end portions and one to be connected to the protector, which will be described later. The wire lead outlet part 5, which collects the three wire leads 9 together, is assembled into the stator core 1.

Wedges 7 are provided to prevent the leakage of coils, when inserted into the stator core 1, from the slot openings to the inner peripheral side of the stator core 1. The wedges 7 also insulate between the coils and teeth end portions (the inner peripheral side) of the stator core 1. The example of FIG. 1, where the number of the slots is 24, thus uses 24 pieces of the wedges 7.

Binding strings 8 are provided to secure the coil ends 6 in place. The binding strings 8, which will be described later in detail, are wound around the outside of the stator core 1, both of the coil ends 6, and the slots (outside of the wedges 7).

Structural relations of the stator core 1, the end surface insulating plates 2, and the slot cell 3 is now described with reference to FIG. 2.

The stator core 1 is formed by magnetic steel plates pressed and punched into a predetermined shape, and then layered by caulking, welding, etc. As shown in FIG. 2, the stator core 1 is shaped like a donut, and includes a plurality (24 pieces in the case of FIG. 2) of slots 11 that are radially formed on the inner peripheral side.

The stator core 1 also includes a plurality of cut surfaces 12 (in four places in the case of FIG. 2) formed on the peripheral side of the stator core 1. The cut surfaces 12 are formed by cutting the outer surface of the stator core 1 straight down at the same pitch in the axial direction. The cut surfaces 12 and the slots 11 are positioned so that all the cut surfaces 12 have the same relation to the slots 11. More specifically, the cut surfaces 12 are arranged at regular intervals of six slots 11, which is a quarter of 24 slots 11, in the circumferential direction. This arrangement does not create front and back sides of the stator core 1. This arrangement also allows the stator core 1 to keep the same shape when the circumferential position is shifted by multiples of 90 degrees. The cut surfaces 12 provide flat surfaces extending in the axial direction on the outer surface of the stator core 1.

The cut surfaces 12 thus formed on the outer surface of the stator core 1 may allow for reducing the width of hoop materials to be used. This may result in boosting the yield of magnetic steel plates, thus leading to low cost production.

The end surface insulating plates 2 are assembled into the stator core 1 on the both axial end surfaces. The end surface insulating plates 2 are made of molded thermoplastic resin such as polybutylene terephthalate (PBT). As shown in FIG. 2, the end surface insulating plates 2 are thin plates to cover the axial end surfaces of the stator core 1. Like the stator core 1, the end surface insulating plates 2 are shaped like a donut.

The diameter of the end surface insulating plate 2 is a little larger than the diameter of the stator core 1. The end surface insulating plate 2 includes rectangular-shaped mounting holes 16 to catch the wire lead outlet part 5 or the protector protecting part 4. The mounting holes 16 are formed at four places in the vicinity of the outer edge of the stator core 1 (regularly spaced along the circumferential direction). The mounting hole 16 may be called a wire lead outlet part mounting hole when catching the wire lead outlet part 5. The mounting hole 16 may also be called a protector protecting part mounting hole when catching the protector protecting part 4.

The end surface insulating plate 2 also includes a plurality of projections 15 that extend vertically (in the axial direction of the stator core 1) from the vicinity of the outer edge (on the outer peripheral side) thereof. The projections 15 are in pairs, and there are four pairs of them in total. The projections 15 are formed so that each pair (two pieces) is positioned to face one of the cut surfaces 12 formed on the outer surface of the stator core 1.

The end surface insulating plate 2 also includes slot-like cutouts 14 formed on the inner peripheral side. The slot-like cutouts 14 are a little larger than the slots 11 on the stator core 1. The shape of the slot-like cutouts 14 almost matches the shape of the slots 11. The number of the slot-like cutouts 14 matches the number of the slots 11, i.e., 24 in the case of FIG. 2.

The end surface insulating plate 2 also includes string catch notches 13 to hold the binding strings 8 for securing the coil ends 6 in place. The string catch notches 13 are angular cutouts (shaped like a letter U) on the outer edge of the end surface insulating plate 2. The string catch notches 13 are almost placed in the extensions of the center lines of the respective slot-like cutouts 14 on the outer peripheral side.

As shown in FIG. 2, two of the end surface insulating plates 2 are assembled into the stator core 1 on the both axial end surfaces. The end surface insulating plates 2 and the stator core 1 are thus secured in place in the axial direction when the projections 15 (eight in total in four pairs) provided on the end surface insulating plates 2 fit into the cut surfaces 12 on the outer surface of the stator core 1. The engagement of the projections 15 on the end surface insulating plate 2 with the cut surfaces 12 on the outer surface of the stator core 1 may also serve to prevent the end surface insulating plate 2 from moving separately from the stator core 1 in the rotational direction. This may also be used for positioning in the circumferential direction.

When the end surface insulating plates 2 are assembled into the stator core 1, the string catch notches 13 and the mounting holes 16 are in the vicinity of the outer surface of the stator core 1. The mounting holes 16 and the projections 15 on the end surface insulating plate 2 are positioned where the respective cut surfaces 12 are formed on the stator core 1. This may allow for combinations of the assembly of the stator core 1 and the end surface insulating plates 2 with a shift by multiples of 90 degrees. This may result in high work efficiency. In addition, the two end surface insulating plates 2 assembled into the stator core 1 on the both axial end surfaces have a uniform shape. This may remove errors in assembly, thereby reducing manufacturing costs of parts.

The slot cells 3 used for insulating between the coils and the slots 11 on the stator core 1 are made of film polyethylene terephthalate (PET). The slot cell 3 includes cuffs 17 that are folded out at the both ends of the slot cell 3 for preventing it from slipping off.

As shown in FIG. 2, the slot cell 3 is bent and folded (the cross section of the slot cell 3 is shaped similar to a letter U). The slot cells 3 are inserted into the respective slots 11 on the stator core 1 from one axial end of the stator core 1 assembled with the end surface insulating plates 2. There are 24 of the slot cells 3 used in this case. The slot cells 3 are secured in place in the axial direction when the cuffs 17 are engaged with the axial end surface of the end surface insulating plate 2.

The two sets of coils of the main winding and the auxiliary winding are formed by predetermined turns of magnet wires. The wedges 7 (See FIG. 1) are also made of bent and folded film PET like the slot cells 3. The wedges 7 are used to prevent coils from leaking through slot openings on the stator core 1 to the inner peripheral side of the stator core 1 when the coils are inserted into the stator core 1. The wedges 7 are also used to insulate between the coils and teeth end portions of the stator core 1.

The coils and the wedges 7 are inserted together into the slots 11 on the stator core 1 where the end surface insulating plates 2 and the slot cells 3 have already been incorporated. When the stator core 1 is set in a jig for inserting the coils into the stator core 1, any one of the cut surfaces 12 in the four positions on the stator core 1 may be selected for positioning. This may result in improving work efficiency and reducing processing costs. Note that when the coils are inserted into the stator core 1, the wedges 7 are extended out from the respective axial end surfaces of the stator core 1 by a predetermined amount.

When the coils are inserted into the stator, then the coil ends 6 of the coils extending out from the both axial end surfaces of the stator core 1 are shaped to a predetermined size. The end surface insulating plates 2 are used here. The coil ends 6 may be shaped by using pressure against the end surface insulating plates. This may result in reducing the circumferential length of coil. A resultant reduction in copper usage (the amount of use of magnet wire) may then allow for reducing costs and improving the performance of products. (When the amount of copper is reduced, then the resistance value is reduced, which results in copper loss reduction.)

The wire lead outlet part 5 and the protector protecting part 4 are now described with reference to FIG. 3.

The wire lead outlet part 5 includes a first wire lead outlet part 18 and a second wire lead outlet part 19.

The first wire lead outlet part 18 is made of molded thermoplastic resin such as polybutylene terephthalate (PBT). As shown in FIG. 3, the first wire lead outlet part 18 includes a first nail 21. The first wire lead outlet part 18 is secured to the stator core 1 when the nail 21 is engaged with a predetermined one of the mounting holes 16 provided on the end surface insulating plate 2 assembled into the stator core 1. Note that the first wire lead outlet part 18 includes prepared holes 22 on the both end portions thereof in the circumferential direction. The prepared holes 22 are used for the installation of a condenser.

The second wire lead outlet part 19 is also made of molded thermoplastic resin such as PBT. The second wire lead outlet part 19 places the wire leads 9 in a predetermined position (into grooves) on the first wire lead outlet part 18. The wire leads 9 are connected to coil end portions and wire leads 34 of a protector 25, and will be connected to the outside of the stator.

A projection 24 formed on the second wire lead outlet part 19 is engaged with a second nail 23 formed on the first wire lead outlet part 18. The second nail 23 is provided for engagement with the second wire lead outlet part 19. The second wire lead outlet part 19 is thus assembled into the first wire lead outlet part 18 with the wire leads 9 sandwiched therebetween. The second wire lead outlet part 19 is thus secured to the first wire lead outlet part 18.

The protector 25 is used to cut off the electric current when the temperature of the coils reaches a predetermined temperature. The protector 25, as shown in FIG. 3, is embedded in a hollowed out space 29 that is formed in a first protector protecting part 26. The first protector protecting part 26 is made of molded thermoplastic resin such as PBT. A second protector protecting part 27 is then assembled into the first protector protecting part 26 where the protector 25 has been embedded in the hollowed out space 29. The first protector protecting part 26 includes holes 32 formed in four positions respectively approximately at the four corners of the first protector protecting part 26. Projections 31 formed on the second protector protecting part 27 are fitted respectively to the holes 32. The projections 31 are provided in four positions corresponding to the holes 32. The second protector protecting part 27 is thus assembled into the first protector protecting part 26. The protector 25 is insulated from outside by the protector protecting part 4. Only the wire leads 34 extend out from the protector protecting part 4 assembled.

Coatings on the coil end portions of the main winding and the auxiliary winding are removed. The coil end portions of the main winding and the auxiliary winding are connected by soldering respectively at one end portion to the respective wire leads 9 (two pieces) whose coatings have been removed. The coil end portions of the main winding and the auxiliary winding are then connected by soldering respectively at the other end portion to one of the wire leads 34 of the protector 25 whose coating has been removed.

The other end portion of the wire lead 34 of the protector 25 is connected by soldering to the wire lead 9 (one piece) whose coating has been removed. The respective soldered portions are insulated by heat shrinkable tubing. Other alternatives to the heat shrinkable tubing of insulation means may also be applied to insulate the soldered portions.

The protector protecting part 4 with the protector 25 embedded therein is secured to the end surface insulating plate 2 when a nail 30 formed on the first protector protecting part 26 is engaged with a predetermined one of the mounting holes 16 formed on the end surface insulating plate 2 assembled into the stator core 1.

The protector protecting part 4 is then bound to the coil end 6 via string grooves 28 for securing the protector protecting part 4 in place, which are formed on the second protector protecting part 27, in order to prevent the protector 25 from moving under molding pressure when the stator is molded, and to reduce the fluctuation of the operation temperature of the protector 25. The string grooves 28 may be called protector protecting part string grooves.

By securing the protector protecting part 4 firmly to the coil end 6, the protector protecting part 4 is prevented from being exposed outside after molding. By reducing the fluctuation of the operation temperature of the protector, the quality of products may be improved.

The first protector protecting part 26 may be provided with ribs 33 that are formed on the outside surface of the hollowed out space. This may help reinforce the protector protecting part 4. This may also allow the protector protecting part 4 to withstand binding force and molding pressure during molding. Hence, the quality of the stator 100 may be enhanced.

The coil ends 6 of the stator 100 are secured to the stator core by a number of the binding strings 8 wound around the outside of the stator 100 in the axial direction via the both coil ends 6 and the slots 11. Each of the binding strings 8 runs through a predetermined one of the slot openings, holds the coil ends 6 at the both axial ends of the stator core 1 tightly by pressing against the respective end surface insulating plates 2, and is thus fastened via a predetermined one of the string catch notches 13 on the outer peripheral edge of the end surface insulating plate 2.

The wire leads 9 and a wire lead connecting portion (not shown in the figure) may also be secured to the coils by using one of the binding strings 8, or any parts may be fastened to the coil end 6 if necessary.

When the binding string 8 is held in place in the string catch notch 13 on the end surface insulating plate 2, then the binding string 8 may be prevented from moving away from position (in the circumferential direction). This may prevent loosening of the binding string 8. The string catch notches 13 on the end surface insulating plate 2 are positioned outside of the outer surface of the stator core 1, which removes possibility of the binding strings 8 touching an angular edge portion of the stator core 1. This may avoid breaking the binding strings 8 by touching the angular edge portion of the stator core 1. Hence, stator quality may be enhanced.

The two coil ends 6 may also be bound independently without being bound as one piece. Only the coil ends 6 may be bound at necessary portions. This may minimize the amount of use of the binding strings 8, thereby reducing part costs.

With a model of a different connection pattern of a coil, the string catch notches 13 to hold the binding strings 8 may be chosen arbitrarily from a multiple choice selection of the string catch notches 13 formed on the outside edge of the end surface insulating plate 2. This may allow parts to be cannibalized, thereby reducing part costs.

A molded stator 39 (See FIG. 4) is formed by molding the stator 100 with thermoplastic resin. The quality of the molded stator 39 may be improved by preventing the coil ends 6 from being exposed after it is molded. It may be improved also by preventing the stator core 1 from being exposed after the stator is molded, and by holding the stator 100 via the end surface insulating plates 2 by a stator holding portion 40 of a mold die (See FIG. 4) while the stator 100 is molded.

As shown in FIG. 4, the motor 200 may include the molded stator 39, a rotor assembly 38, and a bracket 36.

The rotor assembly 38 includes a rotor 41, a rotary shaft 42 fitted to a rotor 41 (here, a squirrel-cage rotor by aluminum die casting), and bearings 37 assembled on the both ends of the rotor 41.

The rotor assembly 38 is inserted from one axial end thereof into the molded stator 39. The rotor assembly 38 is held by the bracket 36 at the other end of the rotor assembly 38. The bracket 36 is then screwed into the molded stator 39 to complete the assembly of the motor 200.

A manufacturing process of the motor 200 is described with reference to FIG. 5.

A manufacturing flow shown in FIG. 5 may be used to achieve the manufacturing efficiency of the motor stator of the present invention.

(First Step): Magnetic steel plates are punched and layered to form the stator core 1. In parallel to this, thermoplastic resin is molded to form the end surface insulating plates 2.

(Second Step): The stator core 1 is assembled with two of the end surface insulating plates 2 on the both end surfaces thereof. In parallel to this, the slot cells 3 are produced.

(Third Step): The slot cells 3 are inserted into the stator core 1. In parallel to this, the coils (the main winding and the auxiliary winding) and the wedges 7 are produced.

(Fourth Step): The coils and the wedges are inserted into the stator core 1 at a time with the aid of a jig for coil insertion.

(Fifth Step): coil ends 6 are shaped by pressure against the end surface insulating plates. In parallel to this, thermoplastic resin is molded to form the first protector protecting part 26 and the second protector protecting part 27.

(Sixth Step): The wire leads 9 are connected to the coil end portions. In parallel to this, the protector 25 is embedded in the hollowed out space 29 of the first protector protecting part 26, and then the second protector protecting part 27 is assembled into the first protector protecting part 26.

(Seventh Step): The stator 100 is assembled with the protector protecting part 4, which holds the protector 25. The protector protecting part 4 is engaged with the predetermined one of the mounting holes 16 formed on the end surface insulating plate 2, and then bound to the coil end 6.

(Eighth Step): The coil ends are secured in place with the binding strings 8. In parallel to this, thermoplastic resin is molded to form the first wire lead outlet part 18 and the second wire lead outlet part 19.

(Ninth Step): The stator 100 is assembled with the wire lead outlet part 5.

(Tenth Step): The stator 100 is molded to produce the molded stator 39. In parallel to this, the bracket 39 and the rotor assembly 38 are produced.

(Eleventh Step): The mold stator 39, the rotor assembly 38, and the bracket 36 are assembled together to have the assembly of the motor 200.

In the above embodiment, the single-phase induction motor was thus taken as an example. The present invention is, however, also applicable to a three-phase motor (a synchronous machine, an induction machine, a synchronous induction machine, etc.).

The motor 200 of this embodiment, which is formed to prevent the molded stator core 1 from being exposed, may be used in a pump to improve the quality of the pump.

EXPLANATION OF REFERENCE NUMERALS

1 stator core
2 end surface insulating plate
3 slot cell
4 protector protecting part
5 wire lead outlet part
6 coil end
7 wedge
8 binding string
9 wire lead
10 teeth
11 slot
12 cut surface
13 string catch notch
14 slot-like cutout
15 projection
16 mounting hole
17 cuff
18 first wire lead outlet part
19 second wire lead outlet part
21 first nail
22 prepared hole
23 second nail
24 projection
25 protector
26 first protector protecting part
27 second protector protecting part
28 string groove
29 hollowed out space
30 nail
31 projection
32 hole
33 rib
34 wire lead
36 bracket
37 bearing
38 rotor assembly
39 molded stator
40 stator holding portion of a die
41 rotor
42 rotary shaft
100 stator
200 motor

The invention claimed is:

1. A method of manufacturing a motor stator, comprising:

punching in a predetermined shape and layering in an axial direction magnetic steel plates to form a stator core, the stator core including an inner surface on an inside of the stator core and an outer surface on an outside of the stator core, the outer surface provided radially outward from the inner surface, the stator core including on the inner surface a plurality of slots to hold coils, forming a plurality of cut surfaces on the outer surface of the stator core in the axial direction to provide flat surfaces on the outer surface, the plurality of cut surfaces spaced apart from one another by a predetermined distance along a circumferential direction;

molding a thermoplastic resin into end surface insulating plates, each end surface insulating plate formed to be larger in outer diameter than the stator core and formed to be in an approximately same shape as the predetermined shape of the magnetic steel plates punched out to form the stator core;

forming a plurality of projections in a vicinity of a peripheral portion of each end surface insulating plate, the plurality of projections extending beyond respective end surface insulating plates in the axial direction;

forming slot-like cutouts on an inner peripheral side of each end surface insulating plate, the slot-like cutouts being larger in size than the slots of the stator core, the inner peripheral side being radially inward from an outer peripheral side of each end surface insulating plate;

assembling two of the end surface insulating plates on respective axial end surfaces of the stator core so that the plurality of projections engage with the cut surfaces on the outer surface of the stator core, and in parallel, producing slot cells;

inserting the slot cells into the stator core, and in parallel, producing coils and wedges;

inserting the coils and the wedges into the stator core at a time with an aid of a jig for coil insertion;

shaping coil ends, which are portions of the coils extending out of both axial end surfaces of the stator core in the axial direction, by pressure against the end surface insulating plates, and in parallel, molding the thermoplastic resin into a first protector protecting part and a second protector protecting part;

connecting wire leads to end portions of the coils, and in parallel, placing a protector inside a hollowed out space of the first protector protecting part, and assembling the second protector protecting part into the first protector protecting part;

assembling the protector protecting part holding the protector into the stator, engaging the protector protecting part with a predetermined mounting hole formed on an end surface insulating plate, and binding the protector protecting parts to the coil end;

securing the coil ends in place by a binding string, and in parallel, molding the thermoplastic resin into a first wire lead outlet part and a second wire lead outlet part;

assembling the wire lead outlet part into the stator;

molding the stator to form a molded stator, and in parallel, producing brackets and a rotor assembly; and assembling the molded stator, the rotor assembly, and the brackets together to have an assembly of a motor.

2. A motor stator comprising:

a stator core that is formed by layering magnetic steel plates punched into a predetermined shape, the stator core including a plurality of slots to hold coils;

a plurality of cut surfaces that are formed on an outer surface of the stator core in an axial direction to provide flat surfaces on the outer surface, the plurality of cut surfaces spaced apart from one another by a predetermined distance along a circumferential direction;

end surface insulating plates that are assembled into the stator core on respective axial end surfaces of the stator core, each end surface insulating plate being larger in outer diameter than the stator core, and formed in an approximately same shape as the predetermined shape of the magnetic steel plates punched out to form the stator core;

a plurality of projections that vertically extend in a vicinity of a peripheral portion of each end surface insulating plate, the plurality of projections being engaged with the cut surfaces on the stator core when the end surface insulating plates are assembled into the stator core;

slot-like cutouts that are larger in size than the slots of the stator core, and formed on an inner peripheral side of each end surface insulating plate; and coil ends, which are portions of the coils, extending out of both axial end surfaces of the stator core in the axial direction, wherein the coil ends are shaped by pressure against the end surface insulating plates, and wherein each end surface insulating plate includes a plurality of string catch notches formed on an outer peripheral edge thereof to hold binding strings to secure the coil ends in place.

3. The motor stator according to claim 2, wherein the motor stator is held by a stator holding portion of a mold die via the end surface insulating plates while the motor stator is molded, thereby preventing the stator core from being exposed after the motor stator is molded.

4. A motor that utilizes a motor stator according to claim 2.

5. A pump that includes a motor according to claim 4.

6. The motor stator according to claim 2, wherein the coil ends extend out of both axial end surfaces of the end surface insulating plates in the axial direction.

7. A motor stator comprising:

a stator core that is formed by layering magnetic steel plates punched into a predetermined shape, the stator core including a plurality of slots to hold coils;

a plurality of cut surfaces that are formed on an outer surface of the stator core in an axial direction to provide flat surfaces on the outer surface, the plurality of cut surfaces spaced apart from one another by a predetermined distance along a circumferential direction;

end surface insulating plates that are assembled into the stator core on respective axial end surfaces of the stator core, each end surface insulating plate being larger in outer diameter than the stator core, and formed in an approximately same shape as the predetermined shape of the magnetic steel plates punched out to form the stator core;

a plurality of projections that vertically extend in a vicinity of a peripheral portion of each end surface insulating plate, the plurality of projections being engaged with the cut surfaces on the stator core when the end surface insulating plates are assembled into the stator core;

slot-like cutouts that are larger in size than the slots of the stator core, and formed on an inner peripheral side of each end surface insulating plate;

coil ends, which are portions of the coils, extending out of both axial end surfaces of the stator core in the axial direction, wherein the coil ends are shaped by pressure against the end surface insulating plates; and a wire lead outlet part that sandwiches wire leads to be connected to end portions of the coils, and is assembled into one of the end surface insulating plates, the wire lead outlet part including a first nail for assembly, wherein each end surface insulating plate includes a plurality of wire lead outlet part mounting holes that are provided to be engaged with the first nail of the wire lead output part in the vicinity of the peripheral portion.

8. A motor that utilizes a motor stator according to claim 7.

9. A pump that includes a motor according to claim 8.

10. A motor stator comprising:

a stator core that is formed by layering magnetic steel plates punched into a predetermined shape, the stator core including a plurality of slots to hold coils;

a plurality of cut surfaces that are formed on an outer surface of the stator core in an axial direction to provide flat surfaces on the outer surface, the plurality of cut surfaces spaced apart from one another by a predetermined distance along a circumferential direction;

end surface insulating plates that are assembled into the stator core on respective axial end surfaces of the stator core, each end surface insulating plate being larger in outer diameter than the stator core, and formed in an approximately same shape as the predetermined shape of the magnetic steel plates punched out to form the stator core;

a plurality of projections that vertically extend in a vicinity of a peripheral portion of each end surface insulating plate, the plurality of projections being engaged with the cut surfaces on the stator core when the end surface insulating plates are assembled into the stator core;

slot-like cutouts that are larger in size than the slots of the stator core, and formed on an inner peripheral side of each end surface insulating plate;

coil ends, which are portions of the coils, extending out of both axial end surfaces of the stator core in the axial direction, wherein the coil ends are shaped by pressure against the end surface insulating plates; and a protector protecting part that holds a protector for cutting off an electric current when the coils reach a predetermined temperature, and is assembled into one of the end surface insulating plates, the protector protecting part including a nail for assembly, wherein each end surface insulating plate includes a plurality of protector protecting part mounting holes that are provided to be engaged with the nail of the protector protecting part in the vicinity of the peripheral portion.

11. The motor stator according to claim 10, wherein the protector protecting part includes in the vicinity of the peripheral portion thereof protector protecting part string grooves for fixing, and the protector protecting part is bound to a coil end via the protector protecting part string grooves.

12. A motor that utilizes a motor stator according to claim 10.

13. A pump that includes a motor according to claim 12.

* * * * *